United States Patent
Himmelmann et al.

(10) Patent No.: US 7,642,684 B2
(45) Date of Patent: Jan. 5, 2010

(54) NESTED VARIABLE FIELD DYNAMOELECTRIC MACHINE

(75) Inventors: Richard A. Himmelmann, Beloit, WI (US); Mohammad Shahamat, Rockton, IL (US)

(73) Assignee: Hamilton Sunstrand Corporation, Rockford, IL (US)

( * ) Notice: Subject to any disclaimer, the term of this patent is extended or adjusted under 35 U.S.C. 154(b) by 311 days.

(21) Appl. No.: 11/706,882

(22) Filed: Feb. 15, 2007

(65) Prior Publication Data

US 2008/0197730 A1    Aug. 21, 2008

(51) Int. Cl.
H02K 16/00 (2006.01)
H02K 16/02 (2006.01)
H02K 1/00 (2006.01)
H02K 7/116 (2006.01)

(52) U.S. Cl. ................ 310/114; 310/112; 310/191; 310/83

(58) Field of Classification Search ......... 310/112–114, 310/190–191
See application file for complete search history.

(56) References Cited

U.S. PATENT DOCUMENTS

| | | | |
|---|---|---|---|
| 5,168,946 A | 12/1992 | Dorgan | |
| 5,578,878 A | 11/1996 | Hall | |
| 5,578,885 A | 11/1996 | Alford et al. | |
| 5,682,073 A | 10/1997 | Mizuno | |
| 5,793,136 A * | 8/1998 | Redzic | 310/114 |
| 5,874,796 A | 2/1999 | Petersen | |
| 5,917,257 A | 6/1999 | Taghezout | |
| 6,114,784 A * | 9/2000 | Nakano | 310/59 |
| 6,201,331 B1 * | 3/2001 | Nakano | 310/114 |
| 6,373,160 B1 * | 4/2002 | Schrodl | 310/114 |
| 6,555,941 B1 * | 4/2003 | Zepp et al. | 310/191 |
| 6,737,778 B2 | 5/2004 | Daikoku et al. | |
| 6,847,137 B2 * | 1/2005 | Furuse | 310/59 |
| 6,894,418 B2 | 5/2005 | Jones et al. | |
| 6,927,516 B2 * | 8/2005 | Furuse | 310/90 |
| 6,943,478 B2 * | 9/2005 | Zepp et al. | 310/191 |
| 6,998,757 B2 * | 2/2006 | Seguchi et al. | 310/266 |
| 7,026,742 B2 * | 4/2006 | Miyake et al. | 310/266 |
| 7,074,151 B2 | 7/2006 | Thompson | |

(Continued)

FOREIGN PATENT DOCUMENTS

EP    1646125    4/2006

(Continued)

*Primary Examiner*—Quyen Leung
*Assistant Examiner*—Eric Johnson
(74) *Attorney, Agent, or Firm*—Kinney & Lange, P.A.

(57) ABSTRACT

A dynamoelectric machine comprises a first rotor shaft, a second rotor shaft and a central element. The first rotor shaft rotates about a central axis of the machine and has a first magnetic drive element disposed about an outer circumference of the first rotor shaft. The second rotor shaft rotates about the first rotor shaft and has a second magnetic drive element disposed about an inner circumference of the second rotor shaft. The central element is disposed between the first rotor shaft and the second rotor shaft and is configurable to remain stationary while the first rotor shaft and the second rotor shaft rotate about the central axis. The central element also includes a third magnetic drive element for interacting with the first magnetic drive element, and a fourth magnetic drive element for interacting with the second magnetic drive element.

14 Claims, 4 Drawing Sheets

U.S. PATENT DOCUMENTS

| | | |
|---|---|---|
| 2002/0084705 A1 | 7/2002 | Kawamura |
| 2004/0155554 A1* | 8/2004 | Morgante ................... 310/266 |
| 2006/0175923 A1* | 8/2006 | Abou Akar et al. ......... 310/114 |
| 2006/0220483 A1 | 10/2006 | Jones et al. |
| 2006/0244317 A1 | 11/2006 | Kramer |
| 2007/0052312 A1 | 3/2007 | Stanetskiy et al. |

FOREIGN PATENT DOCUMENTS

JP     63228941 A  *  9/1988

* cited by examiner

NESTED VARIABLE FIELD DYNAMOELECTRIC MACHINE

BACKGROUND OF THE INVENTION

This invention relates generally to dynamoelectric machines and more particularly to drive systems involving multiple integrated brushless permanent magnet (PM) motors. PM motors convert electrical energy to kinetic energy by exploiting the electromagnetic relationship between a magnet and an electric field. Conversely, PM generators convert kinetic energy to electrical energy using the inverse of the electromagnetic relationship. PM motors and PM generators are collectively referred to as dynamoelectric machines. In a typical PM motor, electric current is passed through stationary windings of conductive wires to generate an alternating magnetic field to push and/or pull a magnetic rotor. The magnetic rotor is coupled to a shaft to produce rotational shaft power. Additionally, high output torque can be obtained from PM motors at low rotor speeds. For these reasons and others, PM motors are well suited for propulsion systems for large, track-laying vehicles such as for military vehicles or construction equipment. Variable field (VF) PM motors are particularly suited for propulsion systems for electric vehicles because of their ability to operate in a constant power mode beyond their conventional corner point, the point of maximum speed output for the given rotor/stator alignment. VFPM motors adjust the relative axial position of the magnet and the conductive wires to adjust the magnetic flux interaction of the two components. Thus, VFPM motors typically require additional axial length for the motor housing such that the magnet and conductive wires can be drawn apart.

Cross-drive type propulsion systems using PM motors are popular selections for electrically powered track laying vehicles due to their ability to transfer power from one vehicle track to the other. However, in order to do so, cross-drive systems typically require the use of a plurality of electric motors. For example, one PM motor is required to provide vehicle propulsion and another motor is required to provide steering power. Thus, cross-drive propulsion systems are typically cumbersome, as the PM motors must be stacked either axially or radially. However, in vehicle propulsion systems, as well as for other diverse ranging applications, it is desirable to reduce space consumption of the PM motors to make space available for other uses, such as for cargo. It is also desirable to keep the width of electric vehicles compatible with roadways and freighting equipment, such as flatbed trucks and trains. Therefore, there is a need for a more compact dynamoelectric machine, and in particular, for a more compact dual variable field permanent magnet motor.

BRIEF SUMMARY OF THE INVENTION

The present invention is directed toward a dynamoelectric machine, comprising a first rotor shaft, a second rotor shaft and a central element. The first rotor shaft rotates about a central axis of the machine and has a first magnetic drive element disposed about an outer circumference of the first rotor shaft. The second rotor shaft rotates about the first rotor shaft and has a second magnetic drive element disposed about an inner circumference of the second rotor shaft. The central element is disposed between the first rotor shaft and the second rotor shaft and is configurable to remain stationary while the first rotor shaft and the second rotor shaft rotate about the central axis. The stator also includes a third magnetic drive element for interacting with the first magnetic drive element, and a fourth magnetic drive element for interacting with the second magnetic drive element.

DETAILED DESCRIPTION

Figure 1:
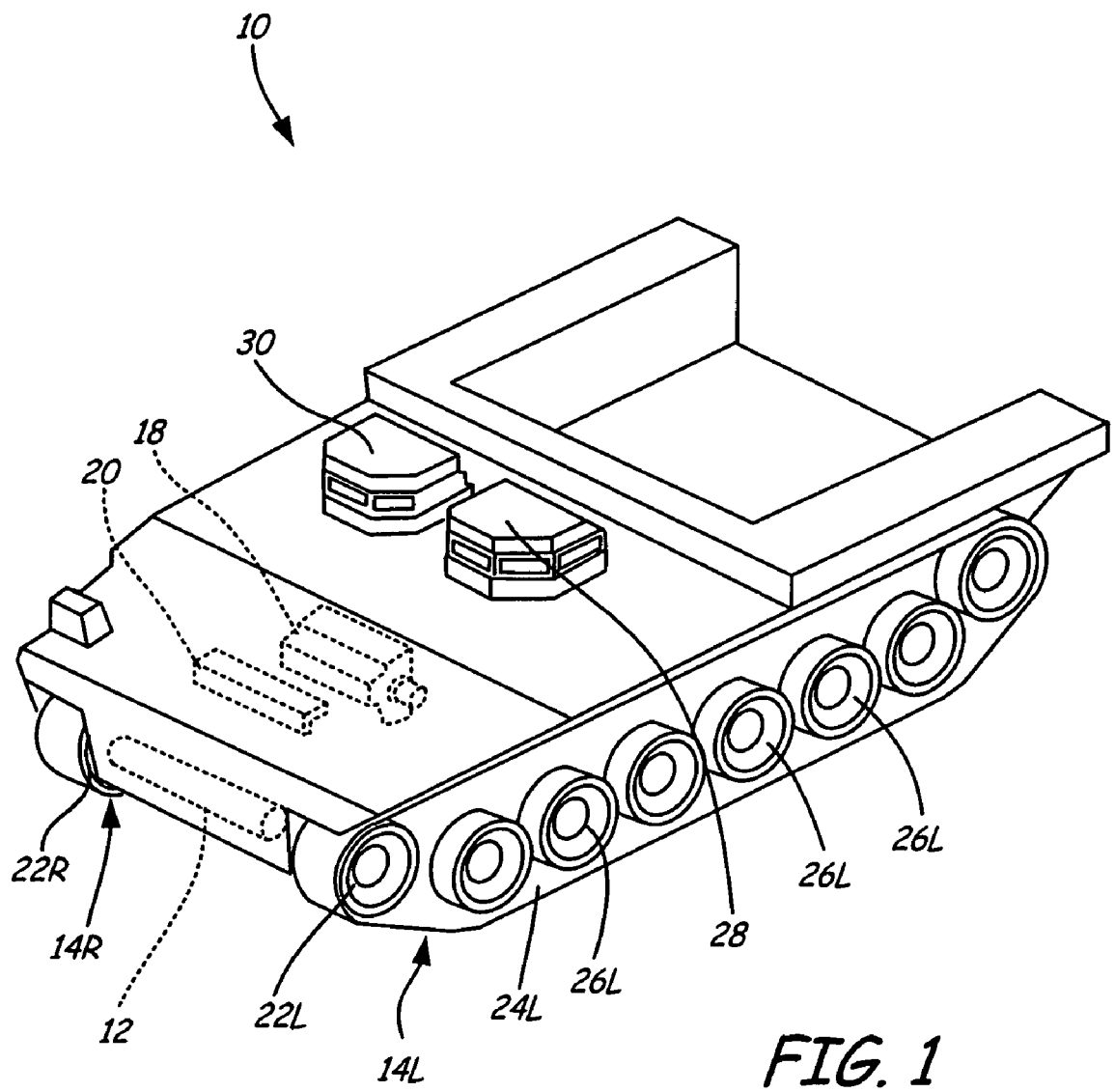
FIG. 1 shows a track-laying vehicle in which a cross-drive propulsion system having nested variable field permanent magnet motors is used.

FIG. 1 shows track-laying vehicle 10 in which cross-drive propulsion system 12 is used. Vehicle 10 comprises a heavy track-laying vehicle such as could be modified for military or construction applications. Vehicle 10 includes cross-drive propulsion system 12, left-side track system 14L, right-side track system 14R, diesel motor 18 and electric generator 20. Cross-drive propulsion system 12 includes variable field permanent magnet motors and, as such, relies on electric power to operate. Diesel engine 18 provides mechanical input to generator 20 for producing the electric power required for operating cross-drive propulsion system 12. Cross-drive propulsion system 12, in turn, drives left-side track system 14L and right-side track system 14R to propel vehicle 10. Left-side track system 14L includes drive sprocket 22L, track 24L and road wheels 26L. Drive sprocket 22L is connected to receive output of propulsion system 12. Sprocket 22L rotates to pull track 24L such that vehicle 10 rolls on road wheels 26L. Propulsion system 12 interacts similarly with right-side track system 14R, which includes similar components such as drive sprocket 22R.

Propulsion system 12 relies on permanent magnet (PM) propulsion motors to transfer power to left-side track system 14L and right-side track system 14R. The PM motors provide constant power to both left-side track system 14L and right-side track system 14R under steady, high-speed operation of vehicle 10. In order to turn vehicle 10, either track system 14L or track system 14R must rotate faster than the other. This typically requires that up to five times as much power, as compared to what is required for straight propulsion, be delivered to the outside track, while a brake is applied to the inside track. For example, about 400 horsepower (HP) (~298.4 kW) may be needed to drive straight, but up to about 2000 HP (~1,492 kW) may be required at the outside track, while the equivalent of 1600 HP (~1193 kW) needs to be absorbed from the inside track, during a turning maneuver. Thus, cross-drive propulsion system 12 includes additional PM steering motors for providing differential speed input to the cross-drive system during steering maneuvers. For example, to execute a left turn, the PM steering motors provide differential speed to planetary gear systems within cross-drive propulsion system 12 to enable a transfer gear system to transfer torque from left track system 14L to right track system 14R during a left turn. Propulsion system 12 utilizes variable field (VF) PM motors in order to regulate power output and speed of vehicle 10. In order to reduce the space occupancy of propulsion system 12 within vehicle 10, propulsion system 12 utilizes compound, nested VFPM motors of the present invention. The nested variable field permanent magnet motors comprise axially and radially nested motors to reduce the axial length and circumference of drive system 12. Thus, additional space is available within vehicle 10, such as for passenger compartments 28 and 30, and the overall width of vehicle 10 is compatible with roads and freighting equipment.

Figure 2:
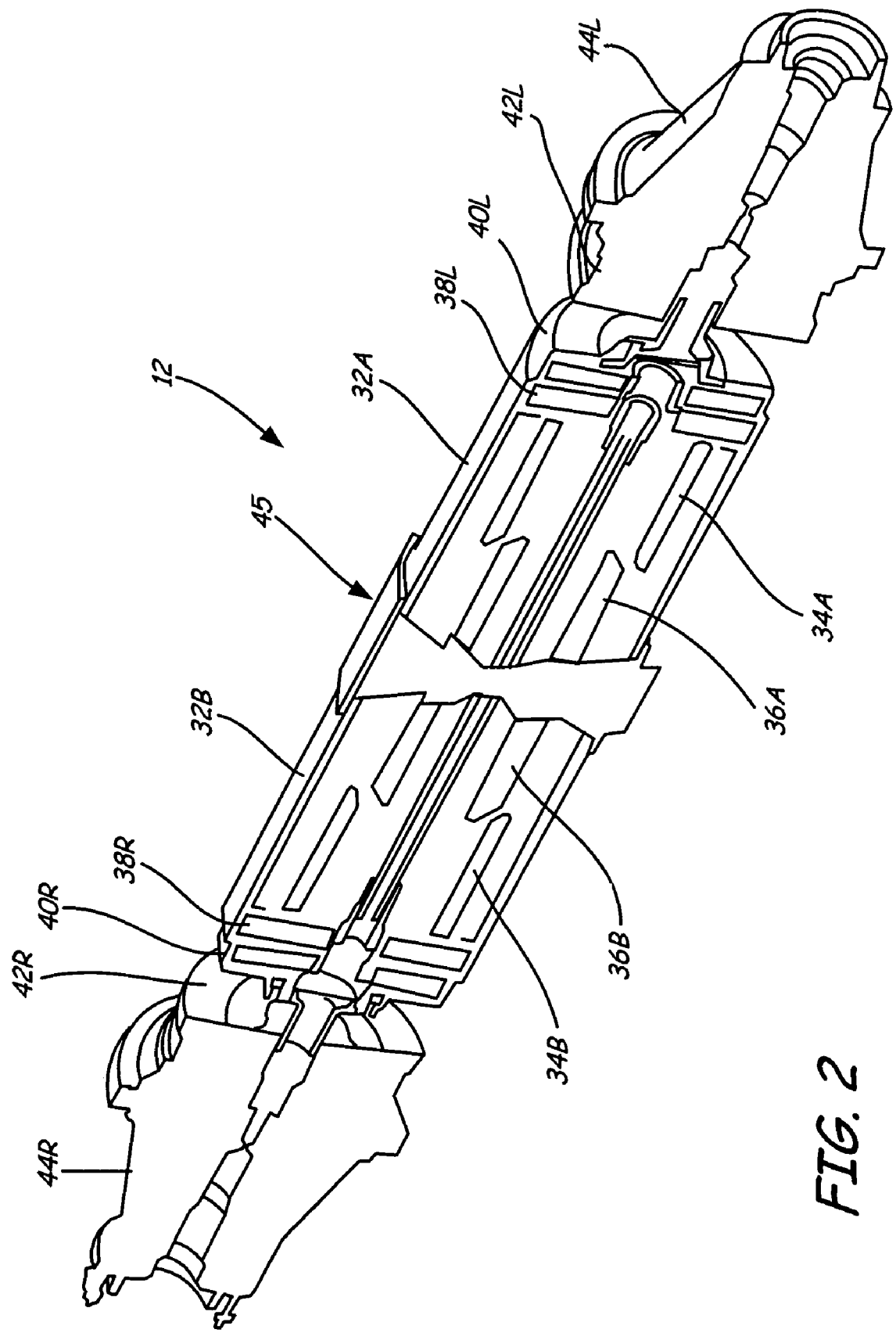
FIG. 2 shows a cross sectional view of a cross-drive propulsion system for a track laying vehicle, such as shown in FIG. 1, having nested variable field permanent magnet motors of the present invention.

FIG. 2 shows a cross sectional view of cross-drive vehicle propulsion system 12 of FIG. 1 having compound motors 32A and 32B of the present invention. Each compound motor comprises a pair of nested variable field (VF) permanent magnet (PM) motors. Compound motor 32A comprises propulsion motor 34A and steering motor 36A. Likewise, compound motor 32B comprises propulsion motor 34B and steering motor 36B. Cross-drive propulsion system 12 includes transfer gear system 45, which permits propulsion motors 34A and 34B, and steering motors 36A and 36B to each independently transfer power to either track system 14L or 14R. Output from motors 34A, 34B, 36A and 36B to track systems 14L and 14R is coordinated to a single output to each track system through speed summing planetary gear system 38L and speed summing planetary gear system 38R. Finally, output of speed summing planetary gear systems 38L and 38R are transmitted to track system 14L and 14R through brakes 42L and 42R, and final drive assemblies 44L and 44R, which are connected with drive sprockets 22L and 22R of vehicle 10.

Compound motors 32A and 32B thus provide redundant propulsive power to vehicle 10. Accordingly, vehicle 10 is able to operate in the event of failure of either compound motor 32A or 32B. During normal operation when vehicle 10 is driven in a straight line, propulsion motors 34A and 34B spin or rotate to provide propulsive power to both track systems 14L and 14R, and steering motors 36A and 36B are stopped. When a steering maneuver is required, propulsion motors 34A and 34B continue driving track systems 14L and 14R, and steering motors 36A and 36B operate to provide additional propulsive thrust to either one of track system 14L or 14R, and to reduce propulsive thrust to the other. For example, to execute a left turn, propulsion motors 34A and 34B continue to operate at the same power required to propel vehicle 10 straight at the desired speed. However, steering motors 36A and 36B work with speed summing planetary gear systems 38L and 38R, and transfer gear system 45 to provide additional power to right side track system 14R and to reduce power to left side track system 14L such that a steering operation can be efficiently executed.

Thus, the power output of each VFPM motor need not be as high as would be needed if a single PM motor were providing propulsion and steering power to each track system. Thus, total power output of generator 20 is more efficiently transferred to left-side track system 14L and right-side track system 14R. In order to optimize the speed and torque characteristics of propulsion motor 34A, steering motor 36A, propulsion motor 34B and steering motor 36B, each is configured as a variable field permanent magnet motor, including rotating and stationary magnetic drive elements such as permanent magnets or coil windings. Thus, each motor requires space within propulsion system 12 and vehicle 10 to permit axial adjustment of the rotor's magnetic drive element with respect to the stator's magnetic drive element. In order to reduce the overall dimensions of system 12, in particular the width, propulsion motor 34A and steering motor 36A are nested within compound motor 32A, and propulsion motor 34B and steering motor 36B are nested within compound motor 32B.

Figure 3:
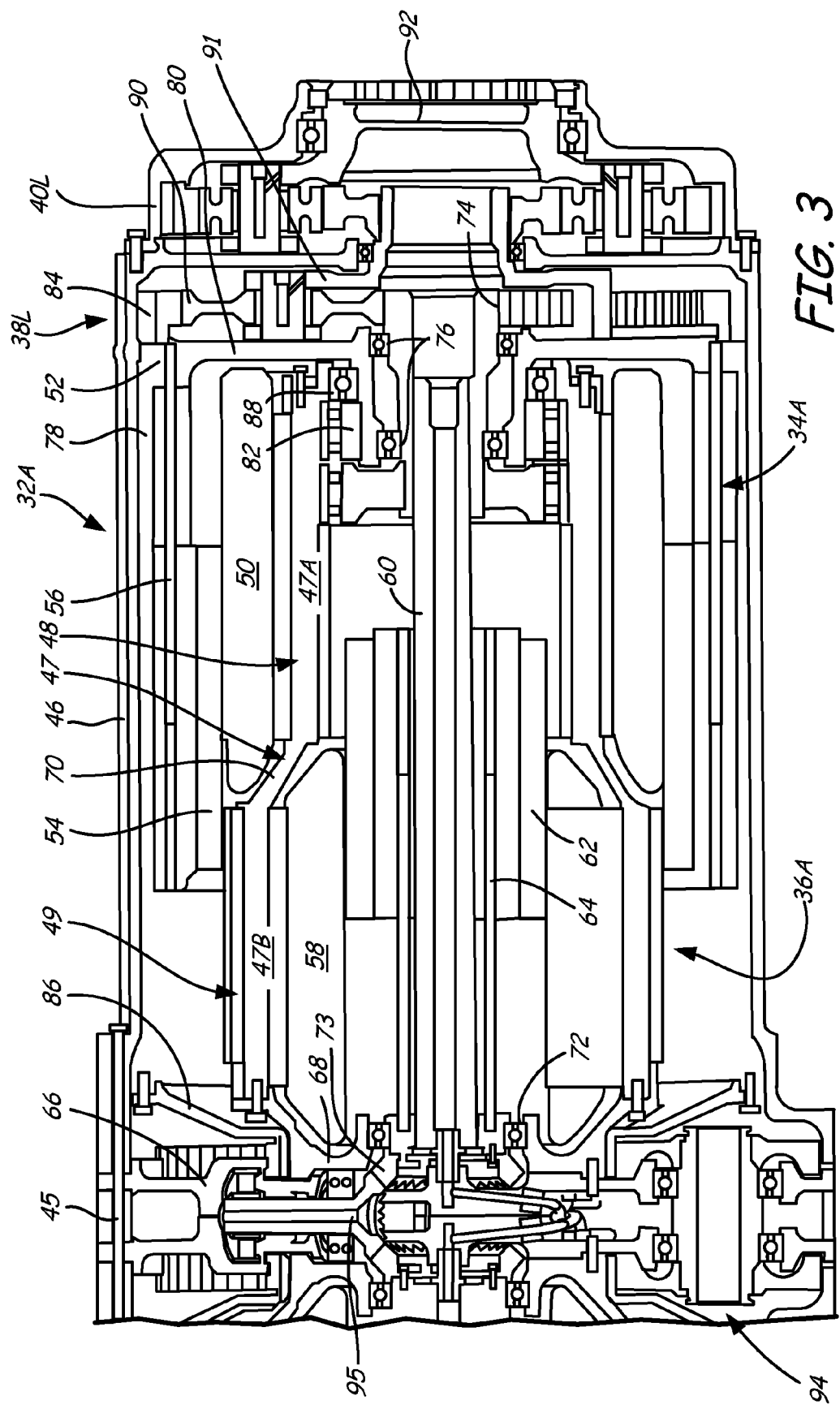
FIG. 3 shows a cross-sectional view through a nested variable field permanent magnet motor of FIG. 2.

FIG. 3 shows propulsion motor 34A and steering motor 36A nested within compound motor 32A of FIG. 2. Compound motor 32A is nested between transfer gear system 45 and speed summing planetary gear system 38L within housing 46. Planetary gear system 38L is connected with single-stage gear reduction system 40L, which is connected through brake 42L, and final drive assembly 44L to drive sprocket 22L of left-side track system 14L. Propulsion motor 34A and steering motor 36A each comprise a variable field permanent magnet (VFPM) motor, which are built around central element 47 within compound motor 32A. Propulsion motor 34A includes first stator 48, first coil winding 50, first rotor 52, first permanent magnet 54 and first actuator 56. Steering motor 36A includes second stator 49, second coil winding 58, second rotor 60, second permanent magnet 62 and second actuator 64. Compound motor 32B includes similar components. Thus, compound motor 32A and compound motor 32B each comprise a pair of nested, variable field permanent magnet motors, each having an independently operable stator and rotor.

Central element 47 is connected to housing 46 through, among other components, brackets 66 and 68 such that central element 47 remains stationary during operation of compound motor 32A. Central element 47 comprises an annular body comprising a central bore, an interior surface and an exterior surface. Central element 47 includes curvature 70, which divides the annular body into first portion 47A and second portion 47B. First coil winding 50 is connected to the exterior surface of first portion 47A of central element 47 to form stator 48, and second coil winding 58 is connected to the interior surface of second portion 47B of central element 47 to form stator 49. Thus, first coil winding 50 faces away from the central bore, and second coil winding 58 faces towards the central bore of central element 47.

Second rotor 60, which is comprised of a cylindrical shaft, is inserted into the central bore of central element 47. Permanent magnet 62 is connected to the exterior of second rotor 60 such that it is able to maintain a magnetic flux path with second coil winding 58. Permanent magnet 62 is connected with rotor 60 through actuator 64 such that magnet 62 is axially slidable with respect to second rotor 60 to adjust the magnetic flux path with second coil winding 58. Rotor 60 is supported at its first end with bearings 72 at bracket 68. The first end of rotor 60 is also connected with gear 73 for connection to transfer gear system 45. The second end of rotor 60 is connected with gear 74 for connection to planetary gear system 38L. Gear 74 is supported within housing 46 by bearings 76 connected with first rotor 52.

First rotor 52 comprises cylindrical body 78, inward projecting bracket 80, axial flange 82, outer ring gear 84 and inner gear 86. Permanent magnet 54 is connected to the interior of cylindrical body 78 such that it is able to maintain a magnetic flux path with first coil winding 50. Permanent magnet 54 is connected to cylindrical body 78 with acutator 56 such that magnet 54 is axially slidable with respect to first rotor 52 to adjust the magnetic flux path between first coil winding 50. Inner gear 86 is connected to transfer gear system 45 such that the inner end of first rotor 52 is supported within compound motor 32A and is rotatable about bracket 68. The second end of rotor 52 is supported at flange 82 by bearings 76, which are supported on second rotor 60, such that first rotor 52 is rotatable about central element 47. The second end of rotor 52 is connected to planetary gear system 38L through outer gear 84. The second end of central element 47 is supported within first rotor 52 with bearings 88 at flange 82. Thus, first rotor 52 is freely rotatable about the exterior of central element 47, and second rotor 60 is freely rotatable about the interior of central element 47.

Propulsion motor 34A and steering motor 36A are nested to reduce the volume of compound motor 32A. First rotor 52, second rotor 60 and central element 47 are concentrically disposed about a central axis of compound motor 32A, with first rotor 52 and second rotor 60 freely and independently rotatable about the central axis. Central element 47 is fixedly secured between first rotor 52 and second rotor 60 about the central axis. As stated above, first stator 48 comprises first coil winding 50 disposed at first portion 47A of central element 47. Likewise, second stator 49 comprises second coil winding 58 disposed at second portion 47B of central element 47. First stator 48 and second stator 49 are electrically isolated from each other by, for example, the composition of central element 47 or the presence of insulation between windings 50 and 58, and central body 47. Thus, central element 47 is common to both propulsion motor 34A and steering motor 36A, which eliminates having a separate mounting component for each of stator 48 and stator 49, thus reducing the overall diameter of compound motor 32A.

Central element 47 includes curvature 70 that further collapses the diameter or radial extent of compound motor 32A. Curvature 70 provides a jog or bend to the annular body of central element 47 such that first coil winding 50 and second coil winding 58 are recessed into central element 47. As such, first coil winding 50 aligns with first portion 47A of central element 47, and second coil winding 58 aligns with second portion 47B of central element 47. Curvature 70 extends deep enough such that when first permanent magnet 54 is withdrawn about actuator 56 or de-stacked from coil winding 50, first permanent magnet 54 is in close proximity to second portion 47B. Likewise, second permanent magnet 62 can be slid upon second actuator 64 in close proximity to and without interference from first portion 47A. Thus, propulsion motor 34A is radially integrated with steering motor 36A to reduce the width of compound motor 32A. Specifically, compound motor 32A need only be as wide as the width propulsion motor 34A when it is de-stacked, rather than the cumulative de-stacked width of both propulsion motor 34A and steering motor 36A.

First coil winding 50 and second coil winding 58 of compound motor 32A are supplied with electric power from generator 20 (FIG. 1) to produce electromagnetic fields. The respective electromagnetic fields interact with first permanent magnet 54 and second permanent magnet 62 to produce rotational motion of first rotor 52 and second rotor 60, respectively. First permanent magnet 54 and second permanent magnet 62 are axially adjustable on first rotor 52 and second rotor 60, respectively, to adjust the magnetic flux paths with coil winding 50 and coil winding 58, respectively. For example, at the motor corner point, permanent magnet 54 is fully engaged with actuator 56 such that the surface area of permanent magnet 54 completely aligns with the surface area of coil winding 50. As such, the magnetic flux exchange between magnet 54 and coil winding 50 is at a maximum, and power supplied to coil winding 50 can be increased to reach the maximum torque output of propulsion motor 34. However, to increase the speed output of rotor 52 beyond what is available at the corner point, permanent magnet 54 can be de-stacked from coil winding 50 to reduce magnetic flux exchange between the two components. The de-stacking of permanent magnet 54 from coil winding 50 increases the maximum rotational speed output of rotor 52, but decreases the maximum torque output of rotor 52. Thus, first propulsion motor 34A can act as a constant torque motor or a constant power motor.

The output of propulsion motor 34A, i.e. the rotation of rotor 52, is transferred to planetary gear system 38L by outer gear 84. Gear 84 rotates planetary gears 90, which rotates gear carrier 91 such that the output of rotor 52 is transferred to single-stage planetary gear reduction system 40L, whereby it can be output to coupling 92 for transfer to final drive assembly 44L (FIG. 2). Likewise, the rotation of rotor 52 is transferred to transfer gear system 45 through inner gear 86 such that its output is transferred to final drive assembly 44R. In a similar fashion, compound motor 32B drives a rotor of a VFPM propulsion motor to redundantly drive track systems 14L and 14R. The outputs of compound motor 32A and compound motor 32B are coupled at gear system 94 and bevel gear 95 such that compound motors 32A and 32B simultaneously and coordinately drive left-side track system 14L and right-side track system 14R. Thus, vehicle 10 is driven forward or backward at a constant speed such that it moves in a generally straight direction.

In order to perform a left-hand turning maneuver for vehicle 10, right-side track system 14R must be driven faster than left-side track system 14L, which requires additional energy input. Compound motor 32A includes steering motor 36A, which provides a steering input to propulsion system 12, and through gear transfer system 45, speed summing planetary gear system 38L and speed summing planetary gear system 38R, redistributes power from one track system to the other.

Steering motor 36A is coupled to planetary gear 90 of speed summing planetary gear system 38L through sun gear 74. Propulsion motor 34A is coupled to planetary gear 90 through ring gear 84. Ring gear 84 of first rotor 52 and sun gear 74 of second rotor 60 work together to turn planetary gears 90 and gear carrier 91. Steering motor 36A and propulsion motor 34A are also coupled to speed summing planetary gear system 38R through transfer gear assembly 45. Transfer gear system 45 works to reverse the relative outputs of steering motors 36A and 36B such that, for a left-hand turn, steering motors 36A and 36B provide sun gear 74 of speed summing planetary gear system 38L with negative rotational velocity and the sun gear of speed summing planetary gear system 38R with positive rotational velocity. Ring gear 84 of speed summing planetary gear system 38L, and the ring gear of speed summing planetary gear system 38R are continued to be driven at the same speed by propulsion motor 34A and propulsion motor 34B. This results in gear carrier 91 of speed summing planetary system 38L slowing down, and the gear carrier of speed summing planetary system 38R speeding up. Thus, torque is transferred from left-side track system 14L to right-side track system 14R through the cross-drive gearing of propulsion system 12. This happens without impacting the output of propulsion motors 34A and 34B. Thus, steering motors 36A and 36B are only required to provide enough torque to overcome the mechanical gearing losses in passing the torque from left-side track system 14L to right-side track system 14R. For example, the cross-drive if the gearing is ninety-eight percent efficient, 2000 HP (~1492 kW) can be transferred from left-side track system 14L to right-side track system 14R with the steer motors only providing a combined 40 HP (29.8 kW) to propulsion system 12.

Thus, by using the nested permanent magnet drive systems of the present invention, propulsion system 12 is able to provide on-demand power to left-side track system 14L and right-side track system 14R without the use of large, high capacity permanent magnet motors having large individual power consumption. Thus, smaller motors, such as propulsion motor 34A and steering motor 36A, can be used to keep the size of propulsion system small. Additionally, steering motor 36A is nested within propulsion motor 34A to further reduce the diameter and width of compound motor 32A. The compactness of compound motor 32A is particularly well suited for cross-drive propulsion systems. However, compound motor 32A is suited for other applications and can be modified accordingly.

Figure 4:
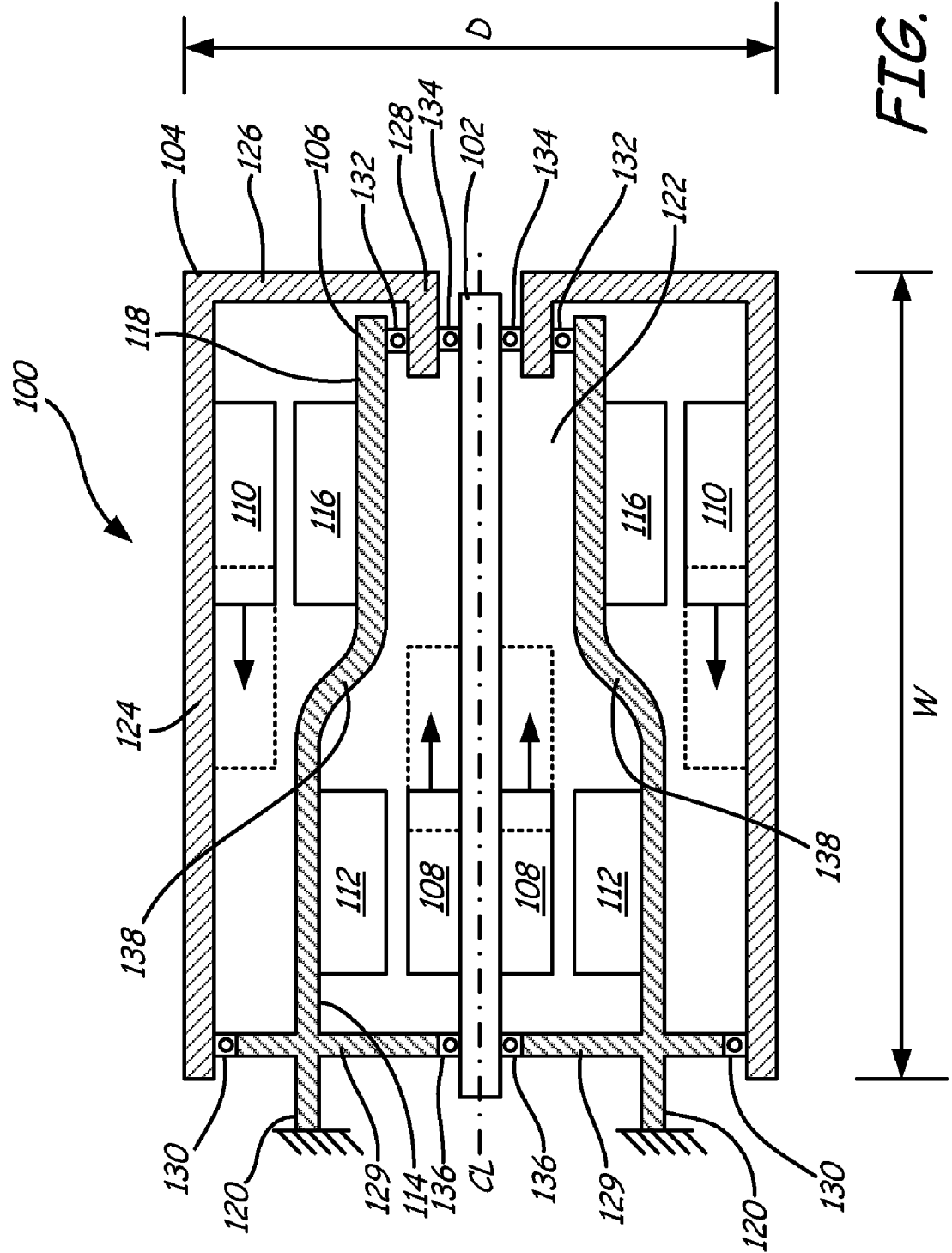
FIG. 4 shows a schematic diagram of a nested variable field dynamoelectric machine of the present invention.

FIG. 4 shows a schematic diagram of nested variable field dynamoelectric machine 100, which represents a simplified, generalized embodiment of compound motor 32A of FIG. 3. Dynamoelectric machine 100 comprises one embodiment of the present invention that can be modified for use in a variety of applications. Dynamoelectric machine 100 includes first rotor shaft 102, second rotor shaft 104 and stator body 106. First magnetic drive element 108 is mounted to first rotor shaft 102 to form a first rotor, and second magnetic drive element 110 is mounted to second rotor shaft 104 to form a second rotor. Stator body 106 includes third magnetic drive element 112, which is mounted to interior surface 114 to form a first stator, and fourth magnetic drive element 116, which is mounted to exterior surface 118 of stator body 106 to form a second stator. Thus, dynamoelectric machine 100 is configured to include two separately interacting sets of rotors and stators.

Stator body 106 comprises an annular body and is fixed at first end 120 such that it remains stationary while first rotor shaft 102 and second rotor shaft 104 are permitted to rotate about centerline CL. First rotor shaft 102 comprises a cylindrical shaft that extends through central bore 122 of stator body 106 such that it rotates within stator body 106. Second rotor shaft 104 comprises a cylindrical shell that surrounds stator body 106 such that it rotates about stator body 106. Second rotor shaft 104 includes annular body 124, support bracket 126 and flange 128, and stator body 106 includes support bracket 129.

A first end of second rotor shaft 104 is supported at the outer surface of stator body 106 by bearings 130, which are radially displaced from centerline CL by support bracket 120 of stator body 106. A second end of second rotor shaft 104 is supported at the inner surface of stator body 106 by bearings 132 at flange 128, which are radially displaced from annular body 124 by support bracket 126. Thus, second rotor shaft 104 is radially displaced from first rotor shaft 102 and is permitted to rotate freely about centerline CL outside of stator body 106 in either a forward or backward direction. Second rotor shaft 104 is also supported on the outer surface of first rotor shaft 102 by bearings 134 at flange 128. First rotor shaft 102 is supported within stator body 106 by bearings 134 at flange 128, and by bearings 136 at support bracket 129. Thus, first rotor shaft 102 is permitted to rotate freely about centerline CL within stator body 106 in either a forward or a backward direction. Thus, first rotor shaft 102 and second rotor shaft 104 are concentrically disposed about centerline CL to reduce diameter D. Likewise, first rotor shaft 102 and second rotor shaft 104 are axially integrated to reduce width W.

First rotor shaft 102 is inserted into stator body 106 such that first magnetic drive element 108 aligns with third magnetic drive element 112. Second rotor shaft 104 is disposed about stator body 106 such that second magnetic drive element 110 aligns with fourth magnetic drive element 116. First magnetic drive element 108 is axially displaceable along first rotor shaft 102 to vary the interaction with third magnetic drive element 112. First magnetic drive element 108 is displaced along first rotor shaft 102 such that it extends within fourth magnetic drive element 116, thus avoiding the necessity for additional axial length of machine 100. Likewise, second magnetic drive element 110 is axially displaceable along second rotor shaft 104 to vary the interaction with fourth magnetic drive element 116. Second magnetic drive element 110 is displaced along second rotor shaft 104 such that it extends to surround third magnetic drive element 112, thus avoiding the necessity for additional axial length of machine 100. Magnetic drive elements 108 and 110 can be axially displaced using any suitable actuation mechanism. As such, width W of machine 100 is reduced. Stator body 106 includes bend 138, which permits third magnetic drive element 112 and fourth magnetic drive element 116 to be brought closer to being radially aligned. As such, diameter D of machine 100 is reduced. However, bend 138 is not so deep as to prevent axial movement of first magnetic drive element 108 and second magnetic drive element 110.

Dynamoelectric machine 100 can be configured as having two nested PM motors, a conventional PM motor nested within an inside out PM motor, as described above. However, dynamoelectric machine 100 can be configured as other types of electric motors, such as induction, switched reluctance, DC brush motors, or the like. Dynamoelectric machine 100 can also be configured to operate either as motor or a generator. First rotor shaft 102 and second rotor shaft 104 independently rotate about centerline CL and can be independently supplied with power and controlled with switches and inverters as is required of specific applications. Additionally, mechanical power can be taken off of or supplied to first rotor shaft 102 and second rotor shaft 104 in a variety of locations as is needed. Magnetic drive elements 108, 110, 112 and 116 can be either an array of permanent magnets that encircles centerline CL, or a coil winding that encircles centerline CL. As such, dynamoelectric machine 100 is readily converted from a motor to a generator or vice versa. In any configuration, dynamoelectric machine 100 provides a means for nesting two rotating bodies having electromagnetic or electromechanical elements about a stationary body having mating electromagnetic or electromechanical elements. Thus, two independently operable dynamoelectric machines, each having an independently operable stator element and rotor element, are concentrically nested. Accordingly, the overall diameter of the machine is reduced. Likewise, the overall width of the machine is reduced, particularly when used in conjunction with variable field dynamoelectric machines.

Although the present invention has been described with reference to preferred embodiments, workers skilled in the art will recognize that changes may be made in form and detail without departing from the spirit and scope of the invention.

The invention claimed is:

1. A nested permanent magnet drive system comprising:
a central element comprising:
an annular body extending from a first end to a second end, the annular body comprising:
a central bore having a central axis;
a jog positioned between the first end and the second end;
a first armature portion extending from the first end to the jog; and
a second armature portion extending from the jog to the second end and displaced axially from the first armature portion by the jog;
a first outward facing magnetic drive element connected to the first armature portion to form a first stator; and
a first inward facing magnetic drive element connected to the second armature portion to form a second stator;
wherein the jog positions the first armature portion radially inward of the second armature portion such that the first outward facing magnetic drive element coaxially aligns with the second armature portion, and the first inward facing magnetic drive element coaxially aligns with the first armature portion;
a first rotor comprising:

a cylindrical body extending across the first armature portion, the jog and the second armature portion of the annular body to concentrically surround the annular body;

a second inward facing magnetic drive element connected to an inner surface of the cylindrical rotor body and for electromagnetically interacting with the first outward facing magnetic drive element; and a first actuator for axially displacing the second inward facing magnetic drive element so as to be positioned, at least partially, between the cylindrical body and the second armature portion of the central element; and a second rotor comprising:

a shaft extending through the central bore and extending across the first armature portion, the jog and the second armature portion;

a second outward facing magnetic drive element connected to an outer surface of the shaft and for electromagnetically interacting with the first inward facing magnetic drive element; and a second actuator for axially displacing the second outward facing magnetic drive element so as to be positioned, at least partially, between the shaft and the first armature portion of the central element.

2. The nested permanent magnet drive system of claim 1 wherein:

the first outward facing magnetic drive element and the first inward facing magnetic drive element comprise coil windings; and the second outward facing magnetic drive element and the second inward facing magnetic drive element comprise permanent magnets.

3. The nested permanent magnet drive system of claim 1 wherein the cylindrical body further comprises:

a bracket projecting radially inward from the cylindrical body; and a flange projecting axially into the central bore from the bracket for supporting the cylindrical body concentrically with the annular body.

4. The nested permanent magnet drive system of claim 3 wherein the annular body further comprises a support projecting radially inward from the annular body for supporting the annular body concentrically with the shaft.

5. The nested permanent magnet drive system of claim 4 wherein the cylindrical body further comprises:

a first end supported on an exterior surface of the annular body by a first bearing; and a second end supported on an exterior surface of the shaft by a second bearing at the flange.

6. The nested permanent magnet drive system of claim 5 wherein the annular body further comprises:

a first end supported on the shaft by a third bearing at the support; and a second end supported on the flange by a fourth bearing.

7. The nested permanent magnet drive system of claim 6 and further comprising:

a ring gear attached to the cylindrical body;

a sun gear attached to the shaft; and a planetary gear linking the ring gear with the sun gear for coordinating output of the nested permanent magnet drive system.

8. A dual permanent magnet motor comprising:

a first motor comprising:

a cylindrical stator body having a first coil forming a first stator winding mounted to an exterior of the cylindrical stator body at a first axial position; and a first rotor configured for rotation about the cylindrical stator body and having a first permanent magnet array configured for rotating about the first stator winding, the first permanent magnet array being axially adjustable with respect to the first rotor to adjust magnetic flux interaction between the first permanent magnet array and the first stator winding; and a second motor comprising:

a second coil forming a second stator winding mounted to an interior of the cylindrical stator body at a second axial position; and a second rotor configured for rotation within the cylindrical stator body and having a second permanent magnet array configured for rotating within the second stator winding, the second permanent magnet array being axially adjustable with respect to the second rotor to adjust magnetic flux interaction between the second permanent magnet array and the second stator winding;

wherein the cylindrical stator body includes a curvature that disposes the first axial position radially inward of the second axial position such that the first stator winding is co-axially aligned with the second axial position and the second stator winding is co-axially aligned with the first axial position; and wherein the curvature is positioned radially between the first and second rotors such that the first and second permanent magnet arrays can be axially displaced to be at least partially radially aligned with the curvature at the same time.

9. The dual permanent magnet motor of claim 8 wherein a first end of the cylindrical stator body is supported by bearings at the second rotor, and a second end of the cylindrical stator body is supported by bearings at the first rotor.

10. The dual permanent magnet motor of claim 9 wherein a first end of the first rotor is supported by bearings on an exterior surface of the stator body, and a second end of the first rotor is supported between bearings on an exterior surface of the second rotor and bearings on an interior surface of the stator body.

11. A dynamoelectric machine comprising:

a first rotor shaft for rotating about a central axis of the machine and having a first magnetic drive element disposed about an outer circumference of the first rotor shaft;

a second rotor shaft for rotating about the first rotor shaft and having a second magnetic drive element disposed about an inner circumference of the second rotor shaft; and a central annular element disposed between the first rotor shaft and the second rotor shaft and configurable to remain stationary while the first rotor shaft and the second rotor shaft rotate about the central axis, and wherein the central annular element includes:

a first axial portion having a third magnetic drive element for interacting with the first magnetic drive element, a second axial portion having a fourth magnetic drive element for interacting with the second magnetic drive element; and a curvature connected axially between the first axial portion and the second axial portion, and disposed radially between the first rotor shaft and the second rotor shaft such that the third magnetic drive element and the fourth magnetic drive element are recessed at least partially within inner and outer diameter limits of the central annular element, respectively;

wherein the first magnetic drive element is axially adjustable with respect to the first rotor shaft to be positioned radially adjacent the second axial portion to adjust magnetic flux interaction between the first magnetic drive element and the third magnetic drive element; and wherein the second magnet drive element is axially adjustable with respect to the second rotor shaft to be positioned radially adjacent the first axial portion to adjust magnetic flux interaction between the second electromagnet element and the fourth electromagnet element.

12. The dynamoelectric machine of claim 11 wherein a first end of the central annular element is supported by bearings on the second rotor shaft, and a second end of the central annular element is supported by bearings on the first rotor shaft.

13. The dynamoelectric machine of claim 12 wherein a first end of the second rotor shaft is supported by bearings on an exterior surface of the central annular element, and a second end of the second rotor shaft is supported between bearings on an exterior surface of the first rotor shaft and bearings on an interior surface of the central annular element.

14. The dynamoelectric machine of claim 13 and further comprising:
    a sun gear attached to the first rotor shaft;
    a ring gear attached to the second rotor shaft; and
    a planetary gear linking the ring gear with the spur gear for coordinating output of the first rotor shaft and the second rotor shaft.

* * * * *